Sept. 20, 1966  D. B. BROUGHTON  3,274,099
CONTINUOUS SOLID-FLUID CONTACTING PROCESS
Filed Feb. 19, 1963
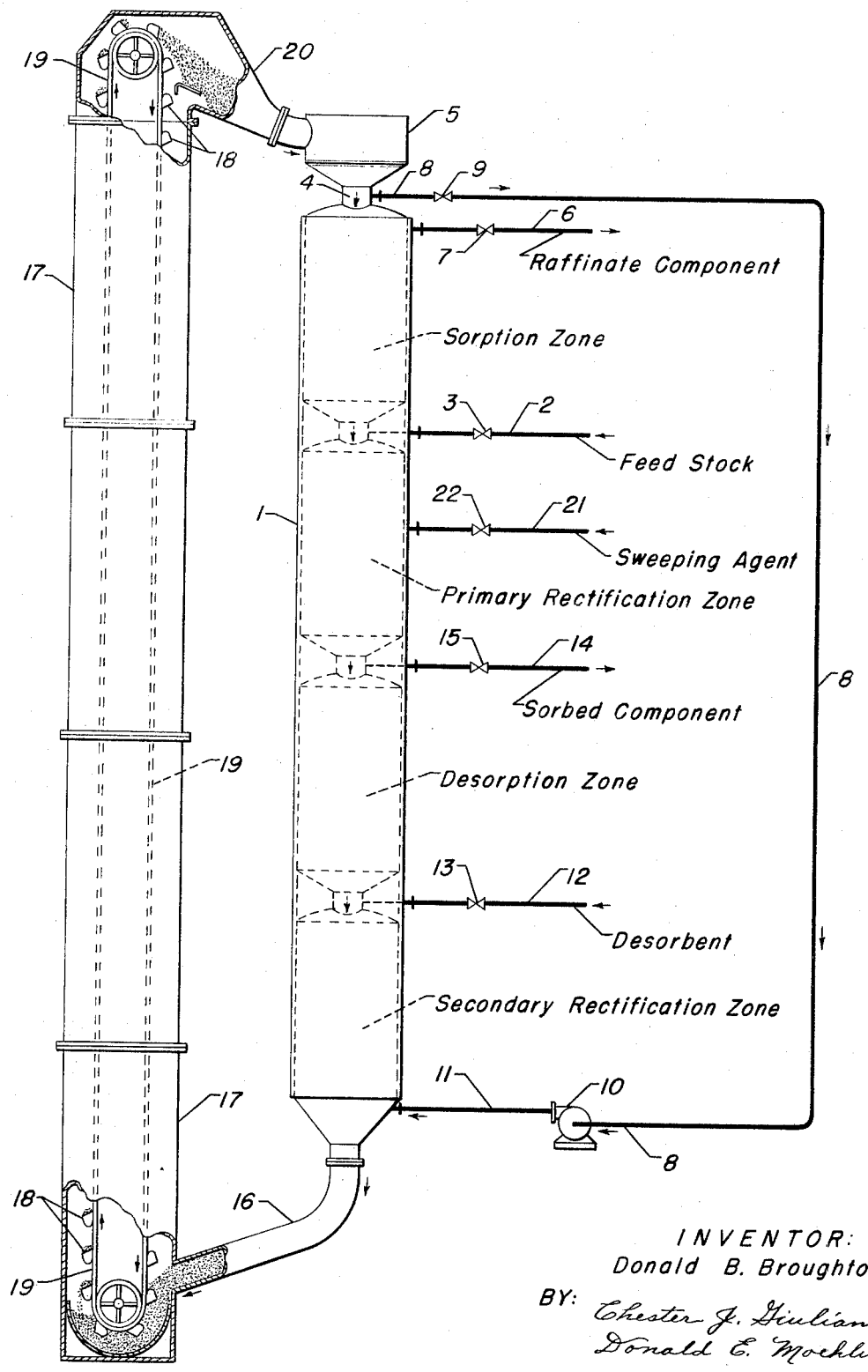
INVENTOR:
Donald B. Broughton
BY: Chester J. Giuliani
Donald E. Moehling
ATTORNEYS United States Patent Office 3,274,099
Patented Sept. 20, 1966

3,274,099
CONTINUOUS SOLID-FLUID CONTACTING
PROCESS
Donald B. Broughton, Chicago, Ill., assignor to Universal Oil Products Company, Des Plaines, Ill., a corporation of Delaware
Filed Feb. 19, 1963, Ser. No. 260,345
7 Claims. (Cl. 208—310)

This application is a continuation-in-part of my copending application: Serial Number 56,516, filed September 16, 1960, now abandoned.

This invention relates to a process for separating mixtures of compounds in fluid form by sorption or adsorption of one or more selectively sorbable components of the mixture on a solid sorbent contacted therewith on a continuously cyclic basis in which the bed of sorbent is moved in countercurrent relationship to the feed stream or in which the fluid inlets and outlets to and from the bed of sorbent are shifted (relative to the stationary sorbent) in the same direction as the flow of the fluid phase. More specifically, this invention concerns an improvement in the foregoing flow arrangement, whereby the purities and yields of the individual product components are substantially enhanced by incorporating the present improvement into the process flow, said improvement relating to the introduction of a fluid into the process fluid stream between the outlet for the selectively sorbed component and the feed stock inlet whereby a greater net volume of the fluid phase flowing between the particles of sorbent flows into the feed stock contacting portion of the bed of solid sorbent particles to thereby more thoroughly flush feed stock from the countercurrent stream of sorbent particles advancing upstream into the sorbate recovery portion of the cycle.

One object of the present invention is to increase the recovery of sorbate and raffinate products from a mixture of fluids using a selective sorption process. Another object of the process is to increase the purity of the sorbate and raffinate products ultimately recovered from a sorption process.

The present invention concerns an improvement in fluid-solid contacting processes generally employing a moving bed of solid particles, either the simulated moving bed procedure described in applicant's U.S. Patent 2,985,589 or the actual moving bed procedures represented by the accompanying diagram, the improvement relating to a means for flushing feed stock from the mass of solid particles advancing upstream in the process cycle by charging a raffinate-type fluid into the mixture of solid particles and fluid at a point in the cycle immediately upstream with respect to the feed stock inlet.

In one of its embodiments the present invention relates to an improvement of the process for continuously separating the components of a fluid mixture of compounds, at least one sorbate component of which is selectively sorbed from the mixture by contact with a solid sorbent and at least one raffinate component of which is relatively less sorbed on the solid, in which process said mixture in fluid phase is charged into a bed of solid sorbent particles maintained in continuous, effectively cyclic countercurrent flow relative to the fluid phase, raffinate is withdrawn from said bed of particles at a point downstream from the point of charging feed stock, desorbent, which displaces sorbate component from the solid sorbent, is charged into said bed of sorbent particles at a point downstream from the point of withdrawing raffinate, sorbate in admixture with desorbent is withdrawn from the fluid stream at a point downstream from the point at which desorbent is charged into the process flow, a portion of said raffinate stream and a portion of said sorbate stream are refluxed into the next adjacent downstream portion of sorbent relative to the points of withdrawing said sorbate and said raffinate streams from the sorbent, the improvement in said process which comprises charging a raffinate-type compound having a boiling point which differs sufficiently from the boiling point of said raffinate component to be separable from said raffinate component by distillation into the fluid phase at a point between the feed stock inlet and the sorbate outlet while maintaining the fluid phase in contact with the solid sorbent continuously in equilibrium with the solid sorbent throughout the process cycle.

Other embodiments of this invention which relate to specific charging stocks, sorbents, process conditions and particular flow arrangements will be referred to in the following further description of the invention.

The present process is applicable generally to separation problems involving absorption as well as adsorption of fluids on solids, being generically referred to herein as "sorption," including separations involving the so-called "molecular sieves" which selectively "sorb" or retain certain components of a mixture of compounds contacted with a mass of the molecular sieves, the selectivity being based upon particular structural characteristics of the components in the mixture. Adsorption processes in which one or more components of the feed stock mixture are retained by surface forces between certain compounds and the solid adsorbent (often referred to as electrostatic attraction) are also included within the scope of this invention and is a type of fluid-solid contacting procedure contemplated to be within the scope of the term: "sorption," as used herein. Adsorbents which selectively retain unsaturated compounds (such as olefinic and aromatic hydrocarbons) and organic compounds containing certain polar radicals and which retain these compounds by the aforementioned surface adsorption mechanism are typified, for example, by such solid adsorbents as silica gel (dehydrated), activated charcoal, the aluminum silicates (such as the various clays), including such typical examples as attapulgus clay, montmorillonite, dehydrated, synthetically prepared composites of alumina and silica, dehydrated and activated at elevated temperatures, activated alumina, particularly gamma-alumina, as well as other materials of similar character. Typical of the feed stocks or mixtures of compounds (which may be separated by contact with a solid, activated adsorbent) include, for example, hydrocarbon fractions (such as a paraffinic gasoline fraction) containing mercaptans and/or amines, the latter polar compounds being selectively retained on the adsorbent particles, mixtures of paraffins and olefins wherein the olefinic hydrocarbon is the component selectively adsorbed by the solid adsorbent, mixtures of aromatic and non-aromatic hydrocarbons wherein the aromatic constituent is selectively adsorbed by the solid adsorbent, mixtures of water vapor and an inert gas, such as nitrogen or air containing moisture (the moisture being selectively adsorbed), mixtures of phenols and/or sulfur compounds such as thiophene present in liquid hydrocarbon fractions, such as gasoline, with the phenolic or sulfur compound being selectively adsorbed, and in a wide variety of other use applications involving adsorption.

Solid sorbents, as contemplated herein, also include molecular sieve-type particulate sorbents, as hereinafter more fully characterized. Molecular sieves generally have a composition corresponding to the metal alumino-silicates and include certain porous alkali metal and alkaline earth metal aluminosilicates which selectively retain within their porous structures only compounds of specific structure. Thus, dehydrated alkali metal aluminosilicates, such as the so-called 4 A. sodium salt derivative which have a porous structure in which the pore openings have cross-sectional diameters of about 4 Angstrom units, are highly active sorbents of organic and inorganic polar compounds, such as water, ammonia, hydrogen sulfide, carbon dioxide and molecules of organic compounds containing less than 4 carbon atoms per molecule. These "sorbate" components have mean cross-sectional diameters of about 4 Angstrom units which adapt them to slide into the pore channels of the 4 A. molecular sieve particles being selectively differentiated from other compounds having larger cross-sectional diameters than 4 Angstrom units, such as the branched chain or isoparaffins. For example, water vapor may be removed from other gases to extremely low-partial pressures by passing the mixture through a bed of 4 A. molecular sieves (dehydrated sodium aluminosilicate) and carbon dioxide may be recovered from nitrogen. The alkaline earth metal aluminosilicates, as well as various other metal derivatives of the aluminosilicates contain pores of about 5 Angstrom units in cross-sectional diameter, and selectively sorb the straight chain components of a feed stock in which the components contain 4 or more carbon atoms per molecule from their branched chain isomers or homologs. The pores present in the latter alkaline earth metal aluminosilicate sorbents are about 5 Angstrom units in cross-sectional diameter which is large enough to permit entry of the straight chain compounds but not sufficiently large to accommodate branched chain and cyclic compounds. Thus, a compound having a branched chain or cyclic structure, such as 2,3-dimethylbutane or cyclohexane may be readily separated as a non-sorbed raffinate from a sorbate compound having a straight chain structure, such as n-hexane (the initial mixture ordinarily being quite difficult to separate by fractional distillation) by contacting a mixture of these hexanes with a dehydrated alkaline earth metal aluminosilicate sorbent; it will be found that the non-sorbed effluent or "raffinate" will be enriched with respect to the branched chain and cyclic constituents (if present in the feed stock mixture) when the amount of sorbent contacted with the feed stock is sufficient to provide a total pore volume of sufficient capacity to accommodate all or substantially all of the normal or straight chain components present in the feed mixture.

Other molecular sieve type sorbents, referred to as "type X" molecular sieves, contain pores of from about 6 to about 7 Angstrom units in cross-sectional diameter, are capable of selectively retainng mono-cyclic aromatic and naphthenic hydrocarbons and of rejecting polycyclic compounds of the same structure. Still other types of activated sorbents which act as molecular sieves include certain heat-treated carbons formed by calcination of activated coconut charcoals, certain activated aluminas and urea and thiourea compositions which form the so-called "clathrates" with normal compounds (urea) or with branched chain compounds (thiourea).

Sorbents of the foregoing types, including molecular sieves, are produced by well-known procedures of the prior art, as described, for example in United States Patents 2,882,243 and 2,882,244, issued to R. M. Milton, etc. For purposes of this invention, various methods of separation, each of which involves the use of solid contacting agents which selectively combine physically with at least one component of a mixture of multiple components to form a "spent" solid, whether clathration, adsorption, occlusion or by chemical reaction, will be referred to herein as "sorption," and the use of the latter term herein to characterize such separation techniques, whether involving adsorption, absorption or other solid-fluid separation methods, is intended to encompass all of such types of separations utilizing a solid contacting agent.

The present process is also characterized herein as a "cyclic" and "continuous" process. It is thereby intended to define a method in which the various influent and effluent streams are charged into and withdrawn from the bed of solid, particulate sorbent, respectively, in a continuous manner (i.e., without disrupting the flow of these streams). In one of its embodiments the present invention contemplates processes in which the solid contacting agent or sorbent in particle form is maintained in a fixed position within the column, providing a process in which the feed stock and desorbent inlets and the withdrawal outlets for the effluent product streams change their positions with respect to the fixed bed(s) of sorbent within the column in equal, unidirectional shifts. The present continuous, countercurrent flow process also contemplates the use of a moving fed of solid sorbent particles in which the inlets and outlets to and from the column are fixed in position relative to each other, but the solid particles of sorbent flow, either upwardly or downwardly through the fluid phase, as a compact moving bed or in a fluidized state, in accordance with well established procedures described in the prior art. The present system or method of contacting the fluid feed stock with the solid sorbent in which the latter particles of solid sorbent are maintained as a fixed bed or as a series of superadjacent fixed beds relative to the moving inlet and outlet points for the feed streams and product outlets is specially recommended when the solid sorbent particles are relatively fragile particles which, if moved during the contacting process would undergo undesirable attrition, resulting in a reduction in the size of the discrete particles to a finely powdered condition through which the fluid phase would not readily flow without channeling during the contacting process. However, by moving the inlet ports of entry for the feed stock and desorbent streams and the outlet ports for the withdrawal of product streams from the solid particles by means of successive equidistant shifts of the inlet and outlet ports in the same direction relative to the fixed bed or beds of solid sorbent, a simulated countercurrent flow arrangement and an effectively cyclic, continuous flow of the solid sorbent relative to the fluid phase is thereby established, since the points of inlet and outlet for the various feed and product streams eventually in the course of the cycle return to their points of beginning and the flow of fluid from the last bed in the series of fixed beds continues, at least in part, into the first bed of any given series of beds. The present process may also be visualized as being effected in a series of four, interconnected functional zones of a single fixed bed of solid sorbent having no actual lines of demarcation between each of the zones other than the zone boundaries defined by the points at which the inlet streams are charged into the bed of sorbent particles and the points at which the outlet streams are withdrawn from the bed of solid particles. The first and farthermost upstream zone (when the feed stock inlet point is established as a point of reference) is referred to as a "sorption" zone, from the downstream outlet of which the present raffinate product is withdrawn; the next downstream zone in the direction of fluid flow and into which a secondary reflux portion of the raffinate stream is continuously charged is referred to as a "secondary rectification" zone from the downstream outlet of which the interstitial fluid is withdrawn as it is displaced by secondary reflux. The fluid thereby continuously displaced from the void spaces between the solid particles is joined by a stream of desorbent supplied from an external source, flowing as a combined stream into the next adjacent downstream zone referred to as a "desorption" zone. The desorbent at the desorption conditions maintained in this zone replaces the sorbate component of the feed stock retained by the solid particles of sorbent the desorbent entering the particles of sorbent in place of the displaced sorbate which is withdrawn from the downstream outlet of the desorption zone. A portion of the desorption zone effluent (the present primary reflux stream), however, by-passes the sorbate product outlet and continuously refluxes into the last downstream "primary rectification" zone, the downstream outlet of which connects with the feed stock inlet; that is, the inlet to the "sorption" zone to complete one cycle of operation. The amount of fluid leaving the primary rectification zone and entering the sorption zone corresponds to the flow of fluid entering the primary rectification zone since the fluids are hydrostatically balanced and the flow of both streams occur simultaneously and in response of one to the other, providing the equilibrium relationships maintained in the present process flow. During the above cycle, the solid sorbent moves through the fluid phase throughout the entire bed or series of beds of sorbent particles, either as a moving bed or by simulated movement as the feed and product inlets and outlets are shifted in a downstream direction.

The terms "upstream" and "downstream" are to be interpreted herein in the ordinary and usual definition in the process arts; that is, the term "downstream" refers to an advance point in the direction of flow of fluid relative to the point of reference, whereas "upstream" refers to a retrospective point in the direction of fluid flow or a point in the bed of sorbent particles already passed by the fluid stream.

The fluid-solid contacting process as described above in which the flow rates of the various inlet and outlet streams are maintained on a continuous basis during the course of the process, the circulation rate of the solid sorbent particles (involving either a moving bed, fixed inlet and outlet ports or a fixed bed of sorbent with moving inlet and outlet ports, as provided herein), and the continuously cyclic, countercurrent flow of the fluid phase relative to the solid particles establishes certain equilibrium relationships between the fluid and solid phases with respect to the transfer of sorbate component therebetween and also between the fluid and solid phases in the desorption zone of the cycle with respect to the transfer of desorbent therebetween and the displacement of sorbate from the solid phase by the desorbent fluid. Thus, after the process has operated for a period sufficient to "line out" and establish such equilibrium conditions, the process cycle at each and every stage remains constantly in equilibrium, producing a constant flow of raffinate and sorbate product streams as long as the flow of inlet streams and temperature and pressure conditions remain constant; the process accordingly stabilizes to a constant and continuous equilibrium, yielding predictable results with known limits. Such steady-state equilibrium operation is in marked contrast with batch-type fluid-solid contacting processes which by their very nature never operate under equilibrium conditions; product yields and compositions are given on the basis of averaging the individual batch results of interrupted operation over long periods comprising many interruptions.

The contacting column, when in the form of a continuous bed, is relatively elongated compared to its width and is more preferably an elongated, vertically tubular bed. An especially preferred arrangement for the contacting zone comprises a bed of sorbent particles divides into a series of compartments or smaller unit "beds" with a conduit of substantially reduced cross-section connecting each compartment and the fluid inlets and outlets to and from the column connecting with the downcomer conduits between the compartments or unit beds.

Suitable charging stocks which may be utilized in the process of this invention include mixtures of compounds containing two or more components, at least one of which, but less than all, is sorbed on a solid sorbent and held with relatively greater tenacity in the sorbent than one or more other components present in the mixture comprising the feed stock. Since the present process improvement is generally applicable to various types of sorption processes, including surface adsorption, clathrate formation, and molecular sieve adsorption, as described above, any mixture of organic compounds containing at least one component subject to the various physical phenomena responsible for selective retention by a solid sorbent may be employed herein as feed stock, including mixed hydrocarbon isomers and structural types, mixed isomeric alcohols, ketones, amines, fatty acids, esters, etc.

The process features of this invention are further illustrated in the accompanying diagram which is described for purposes of illustration with respect to a process employing a moving bed of sorbent particles continuously circulated through a separation column having fixed inlet and outlet ports for charging feed stocks, desorbent, the sweeping agent which provides the basis of the present improved process flow, and the sorbate and raffinate product outlets. As the examples will hereinafter show, moving bed types of processes may be utilized in the separation of mixtures of compounds using solid sorbents, as for example, in the recovery of one or more aromatic hydrocarbons in admixture with normal paraffinic, isoparaffinic or naphthenic hydrocarbons, and for such processes the sorbent may consist of a relatively structurally stable adsorbent, such as silica gel, activated carbon or activated alumina which selectively sorbs the aromatic component from the nonsorbed paraffinic raffinate components of the mixture.

Although the present invention is described by specific reference to the accompanying diagram, illustrating a moving bed process with fixed fluid inlets and outlets, it is not thereby intended to necessarily limit the present invention to such a moving bed system of operation. The present improvements are also applicable, to a fixed bed method of contacting the fluid and solid phases in which the counter-current flow relationship of the fluids relative to the fixed sorbent bed(s) is obtained by providing a system of moving inlets and outlets for the various fluid streams, as shown in my United States patent, Number 2,985,589 issued May 23, 1961, and the disclosure provided by said issued patent is specifically incorporated herein by reference.

Referring to the accompanying diagram, a feed stock mixture of compounds containing a sorbable component and one or more components relatively less tenaciously sorbed on a solid sorbent is charged in fluid phase (that is, as a liquid or as a gas) into a cyclic, continuous sorption process effected in a countercurrent manner, that is, with feed stock flowing in one direction and the solid sorbent flowing in the opposite direction. The feed stock is charged into a separation column which is relatively elongated compared to its width or to the diameter of the column, such as the vertical tubular column illustrated in the accompanying diagram. Referring to the diagram, the feed stock is introduced into column 1 at the feed stock inlet, at a point herein referred to as a point of beginning through line 2 containing valve 3 which controls the flow of feed stock into the column at a rate which is often a critical factor in the operation of the separation column. The flow of the fluid phase in an upward direction through the descending sorbent particles is assured by maintaining the fluid at a higher pressure in the lower portion of the column than above the feed stock inlet, thereby inducing the fluid stream to flow upwardly, in the direction of the resulting pressure drop.

A solid, particulate sorbent capable of sorbing the more readily sorbable component of the feed stock mixture and further, capable of flowing as a dense, compact solids phase by gravitational forces through the column from the top thereof to the bottom is continuously fed into the top of the column from recycle sources through sorbent inlet 4, which receives fresh or reactivated sorbent from storage hopper 5.

The sorbent enters the top of sorption column 1 in an activated or reactivated state, capable of retaining by sorption the selectively sorbable component of the feed stock mixture as it contacts the latter in its upward flow through the column. The sorbent, being in the form of particles, forms a dense phase mass which flows by gravity downwardly through the sorption zone in countercurrent relationship to the feed stock charged through conduit 2. The non-sorbed portion of the feed stock which contacts relatively activated sorbent and gradually becomes richer in raffinate component as it flows upwardly through the sorption zone by virtue of retention of the sorbate component in the feed stock on the solid sorbent eventually arrives at the raffinate component outlet through which a portion of the raffinate in purified form is withdrawn through line 6. Valve 7 in line 6 controls the amount of raffinate component withdrawn from the process as product, the remainder of the raffinate (referred to herein as "secondary reflux") flowing upwardly through conduit 4 into line 8, and through valve 9 which controls the flow of raffinate component for recycle purposes to the bottom of the separation column, the amount thus withdrawn for recycle being conveyed at a higher pressure by means of pump 10 through line 11 into the bottom of the secondary rectification zone which is at a further downstream point in the line of fluid flow.

The flow rate of the raffinate stream thus withdrawn from the raffinate effluent through line 8 to continue in a downstream direction into the lowermost portion of the separation column is just sufficient to provide the necessary quantity of reflux into the secondary rectification zone, a quantity sufficient to displace completely all of the interstitial fluid entrained in the void spaces between the particles of sorbent to thereby replace such interstitial fluid with the recycled raffinate (secondary reflux stream) which will make up the stream withdrawn from the sorbent when the sorbent advances to the next downstream outlet from the column. In order to maintain the purity of the raffinate product at or near 100 percent, the quantity of raffinate reflux recycled into the secondary rectification zone is, according to the present process flow, continuously maintained at a volumetric flow rate sufficient to at least equal the cumulative volume of void space between the particles of sorbent continuously entering the secondary rectification zone. By this means the sorbent is continuously washed free of interstitial fluid, assuring replacement of such fluid with secondary reflux consisting of fluid of raffinate composition which will be withdrawn as the raffinate product stream from the sorbent mass as the latter moves into the top of the sorption zone of the separation column. The fluid thereby displaced enters the fluid stream flowing upwardly through the column, countercurrent to the descending sorbent particles.

At some further downstream point in the fluid flow, the fluid stream is joined by an influx stream of desorbent introduced into the separation column through line 12 in amounts controlled by valve 13, the volume of desorbent being sufficient to effect the desorption of the selectively sorbed component retained by the mass of sorbent particles descending through column 1 as a dense phase.

The desorbent is a fluid material having a boiling point which is outside of the boiling range of the feed stock and which is capable of replacing the sorbate component of the feed stock retained by the sorbent in the sorption zone of the process flow, the actual choice of material for desorption purposes depending upon a variety of mutually inter-related factors, including the type or sorbent utilized in the process, the feed stock charged into the process, and the temperature and pressure conditions maintained in the sorption and desorption zones of the column, hereinafter more fully described. Thus, if the particulate sorbent is a material which absorbs the sorbate component of the feed stock by adsorption on the surface of the sorbent, the desorbent may be an inert gas, supplied to the desorption zone at an elevated temperature, such as nitrogen, carbon dioxide, carbon monoxide, etc., or dry, superheated steam which may be utilized in conjunction with such sorbents as silica gel, activated carbon, activated alumina, etc. In the case of a molecular sieve sorbent of the type utilized for separating normal compounds (sorbate) from branched chain and/or cyclic compounds, such as a dehydrated calcium aluminosilicate sorbent, the desorbent may consist of an inert gas heated to a temperature sufficiently above the temperature of sorption to remove the sorbed component from the internal pores of the sorbent. One of the preferred desorbents for use in the present process when the sorbent is a molecular sieve metal aluminosilicate and the sorbate component of the feed stock to be recovered therefrom during the separation procedure is a normal compound having at least 4 carbon atoms per molecule is another normal compound of preferably lower molecular weight (and therefore, of lower boiling point than the feed stock) the desorbent normal compound being charged into the desorption zone of the process flow at a rate which will provide sufficient desorbent in the desorption zone to surround the individual sorbent particles containing feed stock sorbate within the pore structure of the sorbent with a molar ratio of desorbent to sorbate greater than one, and more preferably, from 10 to about 30 molar proportions, providing a mass action effect which will displace the sorbate component contained within the pores of the sorbent with the normal compound used as desorbent. Thus, for example, in the separation of normal hexane from a hydrocarbon fraction containing the same, together with branched chain or cyclic hexanes, normal butane may be utilized as desorbent to displace the normal hexane sorbed within the particles of sorbent. The normal butane desorbent, in the specific example thus cited, replaces the sorbed normal hexane which enters the fluid stream containing an excess of the normal butane desorbent and from which the normal hexane may be subsequently recovered from the sorbate product stream by simple fractional distillation. For separation processes generally, utilizing molecular sieve sorbents, other normal compounds having boiling points which differ from the sorbate component of the feed stock by at least 10° C. (either above or below the boiling point or range of boiling points of the sorbate component) are also useful desorbents.

Although thermal desorption, using a gaseous or liquid desorbent at an elevated temperature (elevated, that is, with respect to the temperature maintained in the sorption zone) may be employed as an alternative method of desorption, isothermal desorption at essentially the same pressure and temperature conditions maintained in the sorption zone of the process flow, eliminates wide swings in temperature and pressure on the fluid stream and advantageously reduces the attendant cost of utilities for operating the process. When the sorbent utilized in the process is an activated charcoal or activated alumina which effects separation of the components of the feed stock by surface adsorption, a preferred desorbent consists of preheated steam or a high temperature inert gas stream which effects desorption of the sorbed feed stock component by displacement or vaporization therefrom.

The desorbent which enters the process flow through line 12 is charged into the internally circulating fluid stream at a point downstream from the secondary rectification zone, entering the desorption zone wherein replacement or displacement of the sorbate component from the "spent" sorbent flowing countercurrent to the fluid phase occurs. The stream of desorbent and released sorbate component continues in a downstream direction of flow to the sorbate component outlet 14 through which a mixture of desorbent and the desorbed sorbate component is withdrawn at a rate controlled by valve 15 into storage facilities or auxiliary separation equipment, such as fractionators to separate the desorbent from the sorbate product. Such separation facilities are not illustrated on the accompanying diagram but their form and function are well-known in the separation art.

In accordance with the present process flow a portion of the fluid phase (comprising a mixture of desorbent and displaced sorbate product component of the feed stock) arriving at the downstream desorbate outlet 14 is refluxed into the next downstream bed of the column comprising the first of a series of beds or the inlet of that portion of a unit bed comprising the primary rectification zone wherein the void spaces between the particles of spent sorbent are swept or washed free of feed stock entrained between the particles of sorbent by virtue of the upstream contact of feed stock with the descending sorbent particles. Primary reflux flowing into the primary rectification zone just prior to the descent of spent sorbent (i.e., containing sorbate in the pores of the sorbent) into the desorption zone replaces the fluid in the void spaces between particles of sorbent with material of the same composition as the sorbate product stream which will be removed through line 14 as the sorbent descends below the level of sorbate outlet 14. The reflux stream, consisting of a mixture of desorbent and the sorbate component of the feed stock stripped from the sorbent in the upstream desorption zone by virtue of washing the entrained raffinate from between the sorbent particles ensures the removal of extraneous contaminants from the separation zone, the reflux stream effectively sweeping anything other than the desired sorbate and desorbent upwardly in the rising fluid stream. Thus, any raffinate component which tends to be entrained in the void spaces between the particles is thereby swept upwardly toward the raffinate component outlet, preventing entrainment of raffinate in the descending mass of solid particles and precluding contamination of the sorbate product with entrained raffinate entering the desorption zone as the solid sorbent descends into the latter zone.

It has been found, however, in the operation of the process as described above, that because of the time required in the primary rectification zone for transfer of the components between the fluid stream and the void spaces, as well as the time required to effect the transfer of components between the fluid stream surrounding the sorbent particles and the fluid component within the pores of the sorbent, the rate of transfer is not sufficient to complete the removal of entrained raffinate from the void spaces in the mass of solid particles of sorbent during the movement of the particles through the primary rectification zone. Consequently, there is a tendency for feed stock components (including the raffinate component of the entrained feed stock which last previously contacted the sorbent before the latter entered the primary rectification zone) to be carried with the sorbent as it descends into the desorption zone, thereby contaminating the sorbate product removed from the sorption column through line 14. In other words, at the flow rate of primary reflux into the primary rectification zone, the entrained feed stock in the void spaces of the mass of solid sorbent is not completely removed. Although an increase in the flow rate of primary reflux would tend to strip entrained feed stock from the sorbent particles more completely, the maximum permissible reflux rate of flow is limited to a rate less than the cumulative void volume entering the primary rectification zone at a given rate of sorbent circulation; beyond such limit in the rate of primary reflux flow, the sorbate component in the primary reflux would enter the downstream sorption zone where the sorbate would re-enter the cycle and effectively reduce the capacity of the process to handle fresh feed stock.

In the improved process flow arrangement provided by the present invention the downstream flow of fluid from the primary rectification zone for the specific purpose of sweeping feed stock out of the void spaces between the particles of solid sorbent leaving the downstream sorption zone is substantially increased by charging from external sources the present sweeping agent into the process flow through an inlet *upstream* from the feed stock inlet, which is also a downstream point in the primary rectification zone. Not only is the entrained feed stock thereby displaced from the sorbent mass more closely contiguous to the feed stock inlet where the displaced feed stock can immediately join the stream of influent fresh feed stock, but the sweeping agent, being a non-sorbed raffinate-type of material, does not increase the sorbate load on the sorbent in the sorption zone of the process cycle and therefore, does not reduce the capacity of the sorbent for sorbate in this zone as would be the case for the aforesaid increase in the primary reflux flow rate.

In a moving bed type of sorption process, as illustrated in the accompanying diagram, the sorbent as a dense mass of solid particles enters column 1 through port 4 in the top of the column in activated or reactivated condition (being reactivated in the upstream desorption zone). The process described in the accompanying diagram is maintained cyclic and continuous by continuously recirculating the particles of sorbent, after reactivation, from the bottom to the top of the column. For this purpose, a convenient method of recirculating the sorbent comprises withdrawing the reactivated sorbent particles from the bottom of column 1 through line 16 which directs the flow of solid particles as a fluid mass into the lower section of elevator 17 comprising a series of spaced buckets 18 mounted on a continuous chain conveyor 19 which lifts the particles of sorbent in the buckets from the bottom of the shaft to the top of the elevator where the buckets empty the reactivated sorbent into conduit 20 and bin 5 from which the sorbent is discharged into the top of the sorption zone. The particles of sorbent thereafter flow downwardly through the column to repeat the cyclic flow pattern.

The improvement of the foregoing process constituting the present invention and which accounts for the substantially improved raffinate and sorbent product purities obtainable by application of the present improvement is the introduction of a so-called "sweeping agent" comprising a fluid compatible with the feed stock and desorbent fluids present within the system, the sweeping agent being introduced into the process flow (through line 21 in amounts controlled by valve 22 and at a point of introduction into column 1) between the feed stock inlet (line 1) and the sorbate product outlet (line 14). Although the aforementioned advantages arising from the present improvement are primarily based upon increasing the flow of the fluid phase in a downstream direction past the feed stock inlet into the sorption zone, thereby removing entrained feed stock from between the particles of sorbent in the primary rectification zone, certain other advantages arise from the present improvement, based upon the introduction of sweeping agent at a downstream point relative to the outlet of the sorbate component from the internal fluid stream, the sweeping simultaneously increasing the flow of the sorbate product stream through outlet conduit 14 which tends to concentrate the primary rectification effect in the lower portion of the latter zone; that is, closer to the sorbate product outlet.

The influent stream herein referred to as sweeping agent is a raffinate-type material which is not retained (i.e., not sorbed) by the particular sorbent utilized in the process. The sweeping agent is preferably of the same class of material as the feed stock; that is, either a liquid or gas, organic or inorganic, depending upon the class of material comprising the feed stock. When specified herein, a substance having raffinate-type qualities is intended to designate compounds which are not sorbed by the solid sorbent at the particular process conditions, including such generally inert gases as nitrogen, carbon dioxide, carbon monoxide, etc. (where a gas phase system is utilized in the process) or a homolog of the raffinate-type compound present in the feed stock and comprising the raffinate product stream, preferably having a boiling point which differs sufficiently from the boiling point of the feed stock raffinate component to be readily separated from the raffinate product by accessory, subsequent distillation. Thus, in the separation of a mixture of normal and branched chain hydrocarbons and/or cyclic hydrocarbons by means of a molecular sieve sorbent, the sweeping agent may be selected from the higher or lower boiling homologs of the branched chain or cyclic components of the feed stock. A typical specific instance of such a system, for example, is the sorption of n-hexane from a mixture of hexane isomers using a dehydrated calcium aluminosilicate sorbent, followed by desorption of the sorbed normal hexane with normal butane as desorbent. A suitable sweeping agent for such a system is isobutane or an isooctane which is not sorbed by the molecular sieve and which is separable from the hexane by subsequent fractional distillation.

The sweeping agent is supplied at a rate sufficient to substantially equal the volume of void space between the particles of sorbent passing a given point in the process cycle at a given rate of circulation, thereby substantially and continuously removing the entrained feed stock from between the particles of sorbent as the latter is circulated through the process flow. The feed stock thereby displaced joins the fluid stream flowing in a downstream direction of flow and is eventually removed from the circulating fluid phase by withdrawl with the raffinate product stream from which it is separated, for example, by distillation or by disengaging the raffinate liquid from the sweeping agent, if the latter is gaseous. The preferred rate of charging the sweeping agent into the primary rectification zone is at a volume rate of flow equal to or greater than the volume rate of flow of the void spaces between the particles of sorbent, a rate which is dependent in any particular instance upon the particle size of the sorbent, whether a moving bed or fixed bed process is used, and other factors.

The pressure and temperature conditions maintained within the sorption column are dependent upon various factors, such as the feed stock composition, the species of desorbent and whether liquid or gas phase conditions are used, as well as the type of contact between the sorbent and feed stock. In general, the present improvement in the sorption process is particularly evident in liquid phase systems utilizing a fixed bed with moving inlets and outlets or a moving bed process having stationary inlets and outlets in which the mass of sorbent particles moves as a dense bed through the cycle. The process is also especially applicable in the system of selectively sorbing normal or straight chain hydrocarbons or organic compounds by a molecular sieve sorbent for the recovery of a raffinate product stream consisting of a branched chain and/or cyclic compound from a sorbate product consisting of normal or straight chain components present in a feed stock mixture of these types.

The present invention is further illustrated with respect to several of its specific embodiments in the following examples which, however, are not intended to unduly restrict the generally broad scope of the invention necessarily in accordance therewith.

*Example 1*

In the following runs two synthetic hexane mixtures of known composition were utilized as feed stocks to a separation process utilizing a solid absorbent of the molecular sieve type. One feed stock consisted of a mixture of normal hexane and branched chain hexanes and the other stock consisted of a mixture of n-hexane and cyclohexane, each mixture being separated during the operation of the process into a sorbate product in each instance consisting of relatively pure n-hexane and a raffinate product consisting of branched chain hexanes from feed stock No. 1 and cyclohexane, essentially free of n-hexane from feed stock No. 2. In each of the runs, a contacting column comprising a series of twenty-four vertically stacked, interconnected fixed beds packed with pellets having molecular sieve capacity is provided, the twenty-four beds being arranged in four columns of six beds each, the top bed of each column being connected by a fluid flow conduit to the inlet of the bed at the bottom of the next column. Each section of six beds is contained within a 4-inch (3¼ inch O.D.) stainless steel pipe of approximately 6 feet in length, each of the six beds in the four columns containing about 308 cubic inches of a molecular sieve sorbent consisting of ⅛ x ⅛ inch pills of dehydrated calcium aluminosilicate (Linde Air Products Co., 5 A. molecular sieves) containing 20 percent by weight of inert clay binder. Each bed contains an inlet nipple at the bottom of the bed and an outlet nipple of the same size at the top of each of the beds, the outlet of one bed being the inlet of the next superadjacent bed, thereby providing a series of interconnected beds through which the flow of fluids is continuously cyclic, from the bottom to the top of each bed, from the top of one column to the bottom of the next column and from the last to the first bed in the series. Each nipple connecting adjacent beds is in the form of a T-connection. The side-arm of each T is connected by a line to a central distribution valve hereinafter described. The T joint between the outlet of bed No. 1 and the inlet of bed No. 24 is connected by a line with the bottom of bed No. 24. This line contains a liquid pump which delivers pump-around liquid from the outlet of bed No. 1 to the bottom inlet of bed No. 24 at a pressure differential between the 24th and 1st bed in the series of about 65 lbs./in.$^2$.

Four feed and withdrawal lines of ¼ inch pipe (a feed stock inlet line, a raffinate withdrawal line, a desorbent inlet line and a sorbate product withdrawal line) are provided for the process and in the run utilizing a sweeping agent, an inlet line carrying the sweeping agent to the column is also provided, the sweeping agent joining with the raffinate product stream removed from the column.

The central distributing valve outside of the separation column directs the fluid streams into and from the fixed beds of the column, the distributing valve containing twenty-four ports connected by twenty-four lines to the T-joints between the twenty-four fixed beds of sorbent in a manner substantially similar to the apparatus and process shown and described in United States Patent Number 3,040,777, issued to D. B. Carson et al. Thus, each bed is consecutively fed with separate streams of (1) feed stock, (2) desorbent and (3) sweeping agent; simultaneously, intermediate beds have withdrawn therefrom separate streams of (1) raffinate and (2) sorbate, depending upon the position of the rotating plates relative to each other in the central distributing valve. After each 2.2 minutes, the valve simultaneously shifts all of the inlet and outlet ports of the valve and simultaneously shifts the corresponding inlets and outlets of the separation column to the next downstream bed, a complete cycle in which all of the inlet and outlet streams have been charged and withdrawn, respectively, into and from each of the beds in series being completed in about 53 minutes.

The process is started by charging a mixture of hexanes (40 weight percent n-hexane, 60 weight percent cyclohexane in Run No. 2 and a mixture of 40 percent n-hexane, and 60 percent isohexanes in Run No. 1, the isohexanes, consisting of 2-methylpentane, 3-methylpentane, 2,3-dimethylbutane and 2,2-dimethylbutane) at a temperature of 40° C. and at a pressure of 110 lbs./in.$^2$ into the bottom of bed No. 6 (the 6th bed from the top of the first of four columns, each containing 6 beds) at a flow rate of 1.0 gallon/hr., the feed stock flowing upwardly through the superadjacent interconnected beds. At the same instant that feed stock is charged into the bottom of the first column the distributing valve provides an open channel to the port in the rotating valve connected to the pump-around line which interconnects beds 1 and 24 of the contacting column. As the feed stock flows into bed No. 6, the sorbate component of the feed mixture (n-hexane) is selectively removed from the liquid stream by sorption into the molecular sieve sorbent, leaving unsorbed the raffinate component of the feed stock which continues its flow in a downstream direction successively through beds 6, 5, 4, 3, 2 and 1. After the process has attained equilibrium operation, a raffinate stream comprising isohexanes (Run No. 1) or cyclohexane (Run No. 2) and hereinafter more specifically identified, issues from the raffinate outlet of bed No. 1. The remainder of the raffinate (at a flow rate equal to 120 percent of the volume of interstitial fluid leaving bed 24 during the period of 2.2 minutes between successive shifts of inlets and outlets of the column) is pumped as secondary reflux into the bottom of bed No. 24, to provide reflux for the secondary rectification zone.

At the same time that feed stock enters bed No. 6 and raffinate is removed from the top of downstream bed No. 1, a stream of n-butane desorbent at 40° C. and at approximately 100 lbs./in.$^2$ pressure is simultaneously charged into the desorbent inlet of the distributing valve, the valve thereafter directing the n-butane desorbent into the bottom of bed No. 18. Flowing downstream through bed No. 18 at a rate of 1.0 gallon of liquid n-butane per hour, the n-butane desorbent enters the mass of spent sorbent previously contacted with feed stock (containing n-hexane sorbed from the feed stock in a previous cycle of operation), displacing previously sorbed n-hexane from the sorbent as it flows downstream in liquid phase through bed No. 18 and thereafter successively through beds 17, 16, 15, etc., of column No. 3.

As the desorbent stream contacts the spent molecular sieve sorbent particles containing previously sorbed n-hexane, the molar ratio of n-butane surrounding the sieves to the n-hexane sorbed in the particles of molecular sieves increases until at some value of the molar ratio greater than 1 to 1 the n-butane completely displaces the sorbed n-hexane and a mixture of sorbate (n-hexane) and desorbent (n-butane) flows into the next superadjacent downstream bed. The mixed n-hexane-desorbent stream continues in its downstream flow until reaching the outlet in the pipe connecting beds 12 and 13 at the top of bed No. 13 in column 3. This outlet is open by virtue of the position of the rotating plate in the fluid distribution valve, while at the same time the outlets of all intermediate beds 18 to 12 are closed. The mixed sorbate-desorbent stream divides into two portions, one portion thereafter flowing into the pipe connecting the outlet of bed No. 13 with the sorbate product outlet port of the distributing valve. At the position of the valve plug which admits feed stock into bed No. 6 the sorbate product (in admixture with n-butane desorbent) removed from the top of bed No. 13 flows through an internal passageway in the distributing valve to a sorbate product outlet from the valve, into a sorbate product receiver. All other ports in the valve associated with beds Nos. 2 to 5, 7 to 11, 13 to 17 and 19 to 23 are closed at the particular position of the valve plug that causes feed stock to enter the inlet to bed No. 6.

The flow of mixed desorbent and n-hexane flowing from bed No. 13 to the distributing valve and out of the process is sufficient in amount to remove the net input of n-hexane into the process as feed stock. However, all of the n-hexane present in the system is not entirely removed through the outlet of the 13th downstream bed (i. e., from the downstream end of the desorption zone), a primary reflux portion of the mixed sorbate-desorbent stream is allowed to by-pass the sorbate product outlet from bed No. 13 and enter downstream bed No. 12. All of the outlet conduits connected to beds 18 to 13 are closed to external flow because none of the outlet ports of the central distributing valve connected to these beds are blocked and prevent efflux of fluid therefrom.

The volume flow rate of primary reflux (that is, the by-pass portion of the desorbent-sorbate mixture entering downstream bed 12) is sufficient to replace about 0.9 of the interstitial liquid in the void spaces between the particles of sorbent in bed No. 12 during the period (averaging 2.2 minutes) that bed No. 6 remains on stream to receive feed stock. This volume rate of flow of primary reflux is sufficient to replace about 90 percent of the void volume of the bed next adjacent downstream from the bed out of which sorbate product is withdrawn. As the sorbate product outlet is shifted to bed No. 12, the fluid stream withdrawn is of the same composition as primary reflux, or the desorbent-sorbate mixture.

The pump in the recycle line connecting the top of bed No. 1 to the bottom of bed No. 24 raises the pressure on the recycle stream from the top of bed No. 1 (at 45 lbs./in.$^2$) to 110 lbs./in.$^2$ existing at the bottom of bed No. 24, the pressure differential being sufficient to drive the fluid downstream through the sorbent in the superadjacent beds.

The liquid stream of mixed iso-hexanes (Run No. 1) or cyclohexane (Run No. 2) and n-butane desorbent removed through the line connecting the raffinate product outlet from the downcomer between beds Nos. 1 and 24 is diverted into an auxiliary fractionating column containing a reboiler which strips the volatile n-butane desorbent (overhead) from the mixture with cyclohexane (Run No. 2) or isohexanes (Run No. 1), recovered as bottoms. The latter raffinate bottoms product in both Runs Nos. 1 and 2 contains 97.7 percent cyclohexane (Run No. 2) and 97.3 percent isohexanes (Run No. 1), and not more than 2.1 percent n-hexane.

The mixed desorbent-n-hexane sorbate product stream from the sorbate outlet of the distributing valve, recovered as a side-stream from the downcomer between beds 12 and 13, when fractionally distilled, yields a sorbate product consisting of 94.3 percent n-hexane. The overheads from both the raffinate and sorbate fractionators, consisting of n-butane is recycled to the desorbent inlet of the distributing valve for reuse in the process.

The rotary plate of the distributing valve revolves slowly, but continuously, resulting in the flow of feed stock into bed No. 6, the withdrawal of raffinate from bed No. 1, the flow of desorbent into bed No. 18 and the withdrawal of sorbate from bed No. 13 for a period of 2.2 minutes, the flow of the respective streams thereafter commencing into and from beds Nos. 5, 24, 17 and 11, respectively. After approximately 53 minutes of continuous operation, the feed inlet, raffinate outlet, desorbent inlet and sorbate outlet streams have shifted through the complete series of twenty-four beds in the column (one complete cycle) and feed stock again starts to flow into bed No. 6 to commence another cycle.

*Example II*

In the following run, the flow rates of the various streams into and from the containing column and the temperatures and pressures were maintained at the same values specified above in Example I, except that a modified distributing valve was substituted for the rotary valve utilized in Example I to provide for an inlet to the next bed immediately upstream from the bed into which feed stock is charged, the inlet shifting through the series of 24 beds during each cycle of operation, but remaining in fixed relationship to the feed stock inlet (that is, the next adjacent upstream bed). Thus, as feed stock enters bed No. 6, a separate inlet stream is simultaneously provided for bed No. 7. The upstream inlet referred to herein as a sweeping agent is isobutane, a raffinate type compound that is not retained by the sorbent and which boils at a temperature below any of the hexane feed stock components and is therefore readily separable by distillation from the sorbate and raffinate product streams. The isobutane sweeping agent is charged continuously at a pressure sufficient to flow in downstream direction, at a rate of 0.5 gallon/hr. and at a pressure of 100 lbs./in.$^2$. As a raffinate-type compound and being introduced into the process flow at a point relatively upstream from the point of charging the feed stock, the sweeping agent prevents the feed stock from flowing in an upstream direction. The additional fluid stream provided by the sweeping agent introduced into the circulating stream of fluid upstream from the feed stock inlet thus adds to the flow of liquid in a downstream direction, carrying with its any feed stock which would tend to flow upstream toward the n-hexane product outlet and continuously washes the interstitial fluid from the void spaces between the particles of molecular sieves. The raffinate component of the feed stock which occupies the void spaces between the particles of sorbent as the n-hexane enters into and is retained in the pores of the molecular sieve particles is thus carried downstream toward the raffinate outlet instead. In the absence of the sweeping agent, the raffinate component of the feed stock would otherwise tend to be physically entrained in the solid phase as the latter effectively moves upstream toward the sorbate outlet and would thus tend to contaminate the sorbate product. Instead of feed stock raffinate being entrained in the solid particles of molecular sieves, isobutane sweeping agent is entrained in the solid and enters the sorbate product outlet. But since isobutane boils at a significantly lower temperature than n-hexane, it is readily separated from the sorbate product by distillation leaving a substantially pure residual sorbate product. The sweeping agent is also readily separated by distillation from the isohexane raffinate product stream.

The results of the present run compared to the run of Example I, above, in which no sweeping agent is separately introduced indicates that both the sorbate (n-hexane) and raffinate products are of greater purity (99.9 percent n-hexane and 99.5 percent isohexane, respectively) than the products separated in the runs of Example I (94.3 percent normal hexane and 97.3 percent isohexane, respectively), without sacrifice in the yield of sorbate and raffinate products.

The increase in the purities of the products at substantially the same yields indicates that the introduction of sweeping agent into the fluid stream is accomplished without disrupting the equilibrium between the transfer of sorbent from the fluid phase into the solid sorbent or the temperature equilibrium maintained throughout the cycle.

It is evident that at the same flow rates and process conditions that are maintained in Example I above, except that a stream of isobutane is added to the fluid stream between the feed stock inlet and sorbate product outlet, the n-hexane sorbate product and raffinate isohexane, products were produced at the same quantitative rates of flow, but the product purities were significantly greater.

*Example III*

In the following run the aromatic hydrocarbon components of a petroleum reformate fraction are separated by adsorption on charcoal, utilizing the present process modification to increase the purity of the aromatic product recovered.

The feed stock is an 80–160° C. fraction of a petroleum reformate (Platformate produced by reforming gas oil over a platinum-alumina-halogen composite catalyst) containing 34 percent aromatics of which 64 percent by weight is benzene, 22 percent by weight is toluene and 14 percent by weight is xylene. The adsorbent utilized in the process is activated charcoal particles maintained in a circulating, moving bed in which the charcoal particles, following reactivation by desorption of the aromatics from the charcoal with superheated steam are lifted to the top of the adsorption tower by means of a bucket elevator. The feed stock is charged at the rate of one volume of liquid charge per 18 volumes of charcoal at a temperature of 30° C. and at a pressure of 50 lbs./in.$^2$ into the adsorption column at a point approximately ⅓ the distance from the top of the column from which raffinate paraffins are withdrawn as one of the product streams. Charcoal adsorbent is charged and circulated as a moving bed through the column at a rate of 0.25 lineal foot per minute.

Steam at a temperature of 110° C. is charged into the column at a point approximately ¼ of the length of the column from the bottom. A mixture of steam and aromatic hydrocarbons is withdrawn as adsorbate product from the midpoint of the column. A sweeping agent consisting of n-pentane is charged into the column in liquid phase at a point between the feed stock inlet and the adsorbate product (aromatics) outlet at a rate equal to 1 volume per 30 volumes of charcoal.

The aromatic hydrocarbon adsorbate product is recovered as an upper layer from the condensate of the steam-aromatic effluent, the product, after drying contains 99+ percent aromatics. The raffinate stream recovered as effluent from the top of the column contains less than 2 percent by weight of aromatics.

I claim as my invention:

1. An improvement in the process for continuously separating the components of a fluid mixture of compounds, at least one component of which is selectively sorbed from the mixture by contact with a solid sorbent and at least one other component of which is relatively less sorbed on the solid, in which process said mixture in fluid phase is charged into a bed of solid sorbent particles maintained in continuous, cyclic and effectively countercurrent flow relative to the fluid phase, raffinate is withdrawn from the bed of particles at a point downstream from the point of charging feed stock, desorbent which displaces sorbate component from the solid sorbent is charged into said bed of sorbent particles at a point downstream from the point of withdrawing raffinate, sorbate in admixture with desorbent is withdrawn from the fluid stream at a point downstream from the point at which desorbent is charged into the process flow, a portion of said raffinate stream and a portion of said sorbate stream continuously refluxed into the next adjacent downstream portion of sorbent relative to the points of withdrawing said sorbate and said raffinate streams from the sorbent, the improvement in said process which comprises charging a raffinate-type compound having a boiling point which differs sufficiently from the boiling point of said raffinate component to be separable from said raffinate component by distillation into the fluid phase at a point between the feed stock inlet and the sorbate outlet, while maintaining the fluid phase in contact with the solid sorbent continuously in equilibrium with the solid sorbent throughout the process cycle.

2. The process of claim 1 further characterized in that said sorbent is maintained as a fixed bed within said separation process and the inlet and outlet points for the fluid streams are shifted in the same direction in equal increments to obtain a simulated, effectively cyclic flow of sorbent.

3. The process of claim 1 further characterized in that said sorbent is maintained within the separation process as a moving bed of solid particles and the inlets and outlets for the fluid streams into and from said bed of sorbent are maintained in fixed relationship to the moving bed, the sorbent being returned cyclically from the end of the process flow to the point of beginning.

4. The process of claim 1 further characterized in that said raffinate-type compound is a lower homoloy of the raffinate component of said feed stock mixture.

5. The process of claim 1 further characterized in that said sorbent is a molecular sieve solid sorbent of the dehydrated metal aluminosilicate type maintained in the sorption process as a fixed bed and said mixture of components is a mixture of normal and isoparaffinic hydrocarbons.

6. The process of claim 5 further characterized in that said metal aluminosilicate is dehydrated calcium aluminosilicate, said mixture of hydrocarbons contains at least 4 carbon atoms per molecule, and said raffinate-type compound is a lower isoparaffinic hydrocarbon than the isoparaffinic component of the feed stock.

7. The process of claim 1 further characterized in that said raffinate-type compound is charged at a rate sufficient to maintain the flow of feed stock in a downstream direction of flow relative to the sorbent.

References Cited by the Examiner

UNITED STATES PATENTS

| 2,552,435 | 5/1951 | Knox et al. | 208—310 |
| 2,673,176 | 3/1954 | Whitney | 208—310 |
| 2,726,986 | 12/1955 | Gross | 208—310 |
| 3,094,483 | 6/1963 | Hengstebeck | 208—310 |
| 3,160,581 | 12/1964 | Mattox et al. | 208—310 |
| 3,184,518 | 5/1965 | Sanders et al. | 208—310 |

ALPHONSO D. SULLIVAN, *Primary Examiner*.